United States Patent [19]

Takahashi et al.

[11] Patent Number: 5,182,711
[45] Date of Patent: Jan. 26, 1993

[54] MOTOR CONTROL SYSTEM FOR ELECTRIC POWER STEERING APPARATUS

[75] Inventors: Tsutomu Takahashi; Saiichiro Oshita; Toyohiko Mouri, all of Tokyo, Japan

[73] Assignee: Fuji Jukogyo Kabushiki Kaisha, Tokyo, Japan

[21] Appl. No.: 651,058

[22] Filed: Feb. 5, 1991

Related U.S. Application Data

[63] Continuation of Ser. No. 378,125, Jul. 11, 1989, abandoned.

[30] Foreign Application Priority Data

Jul. 19, 1988 [JP] Japan .................. 63-180631

[51] Int. Cl.$^5$ ........................................ B62D 5/04
[52] U.S. Cl. .................. 364/424.05; 180/79.1; 180/142
[58] Field of Search ............ 364/424.05; 74/388 PS; 180/79.1, 141, 142, 143

[56] References Cited

U.S. PATENT DOCUMENTS

| | | | |
|---|---|---|---|
| 4,629,952 | 12/1986 | Shimizu | 180/79.1 |
| 4,687,976 | 8/1987 | Shimizu | 180/79.1 |
| 4,834,201 | 5/1989 | Miyazaki et al. | 180/79.1 |
| 4,875,541 | 10/1989 | Oshita et al. | 180/79.1 |

Primary Examiner—Gary Chin
Attorney, Agent, or Firm—Beveridge, DeGrandi, Weilacher & Young

[57] ABSTRACT

A motor control system controls a steering apparatus with an electric motor. A command signal is generated in accordance with a torsion torque of the steering apparatus and the rotational direction and torque of the electric motor is controlled in accordance with the command signal. The system includes a vehicle speed sensor, a hysteresis circuit for changing a hysteresis width in accordance with an output from the vehicle speed sensor, and a phase compensation designating section responsive to an output from the torsion torque sensor supplied via the hysteresis circuit for outputting a command signal corresponding to a change rate of the torsion torque, so that the rotation direction and torque of the electric motor is controlled in accordance with the command signal. The hysteresis circuit makes large the hysteresis width during a high speed running of a vehicle to avoid influence of external disturbance due to vibrations from roads.

4 Claims, 6 Drawing Sheets

FIG. 11

MOTOR CONTROL SYSTEM FOR ELECTRIC POWER STEERING APPARATUS

This application is a continuation of application Ser. No. 07/378,125, filed Jul. 11, 1989, now abandoned.

BACKGROUND OF THE INVENTION

1. Field of the Invention

The present invention relates to a motor control system for an electric power steering apparatus to assist steering power.

2. Related Background Art

The motor control system for the electric power steering apparatus of this type has already been proposed by the present applicant (refer to Japanese Patent Laid-open Publication JP-A-61-98675). This motor control system is provided with an assist command unit for generating an assist signal in accordance with an output from a torsion torque sensor which detects a torsion torque of a steering apparatus, the assist signal having a characteristic that the absolute value thereof increases as the torsion torque increases, and with a phase compensation command unit for immediately generating a supplementary assist signal in accordance with a change rate of the torsion torque. The sum of the assist signal and supplementary assist signal is used as a command signal, and the rotational direction and torque of an electric motor is controlled.

The phase compensation command unit immediately outputs a supplementary assist signal corresponding to the change rate of the torsion torque if the change rate is large. Therefore, during repetitive right and left turns the moment of inertia of the electric motor is immediately absorbed thus improves steering feeling.

However, the supplementary assist signal is outputted even when vibrations from roads are picked up by the torsion torque sensor during vehicle running, and thus it is easy to receive external disturbances. Such external disturbance can be eliminated by giving a hysteresis to an input of the torsion torque sensor. However, if the hysteresis width is large, the response of the control apparatus deteriorates.

SUMMARY OF THE INVENTION

The present invention has been made in consideration of the above problem. It is therefore an object of the present invention to provide a motor control system for an electric power steering apparatus for eliminating external control disturbances due to vibrations from roads while retaining a good control response.

To achieve the above object of this invention, a motor control system for an electric power steering apparatus mounted on a motor vehicle having a vehicle speed sensor for detecting a vehicle speed, a torsion torque sensor for detecting a torsion torque of a steering apparatus, a steering angle sensor for detecting a steering angle of the steering apparatus, an assist command unit responsive to the vehicle speed and the torsion torque for generating an assist signal to the electric power steering apparatus, a return command unit responsive to the steering angle for providing a return signal, a steering angle phase compensation command unit responsive to the steering angle for producing an attenuation signal, and a drive control unit responsive to the assist, the return and the attenuation signals for controlling the electric power steering apparatus, comprises phase compensation mean responsive to the torsion torque and the vehicle speed for producing a supplementary assist signal. The phase compensation means further comprise hysteresis calculating means responsive to the vehicle speed and the torsion torque and provided in the phase compensation means for calculating a hysteresis of which width increases to a predetermined value in accordance with an increase of the vehicle speed.

When the torsion torque increases to a larger value than a predetermined value as set at the hysteresis means, the supplementary assist signal corresponding to the change rate of the torsion torque, and a corresponding command signal for controlling the electric motor are immediately generated. If the torsion torque has a value smaller than the predetermined value because of external disturbance due to vibrations from roads, the supplementary assist signal is not outputted from the hysteresis means.

The hysteresis width in the hysteresis providing means is set at a small value during middle and low speed running where vibrations by a rough road are small, and set at a large value at high speed running where vibrations by the road are large.

DETAILED DESCRIPTION OF THE PREFERRED EMBODIMENTS

The embodiment of the present invention will be described in detail with reference to the accompanying drawings.

Figure 1:
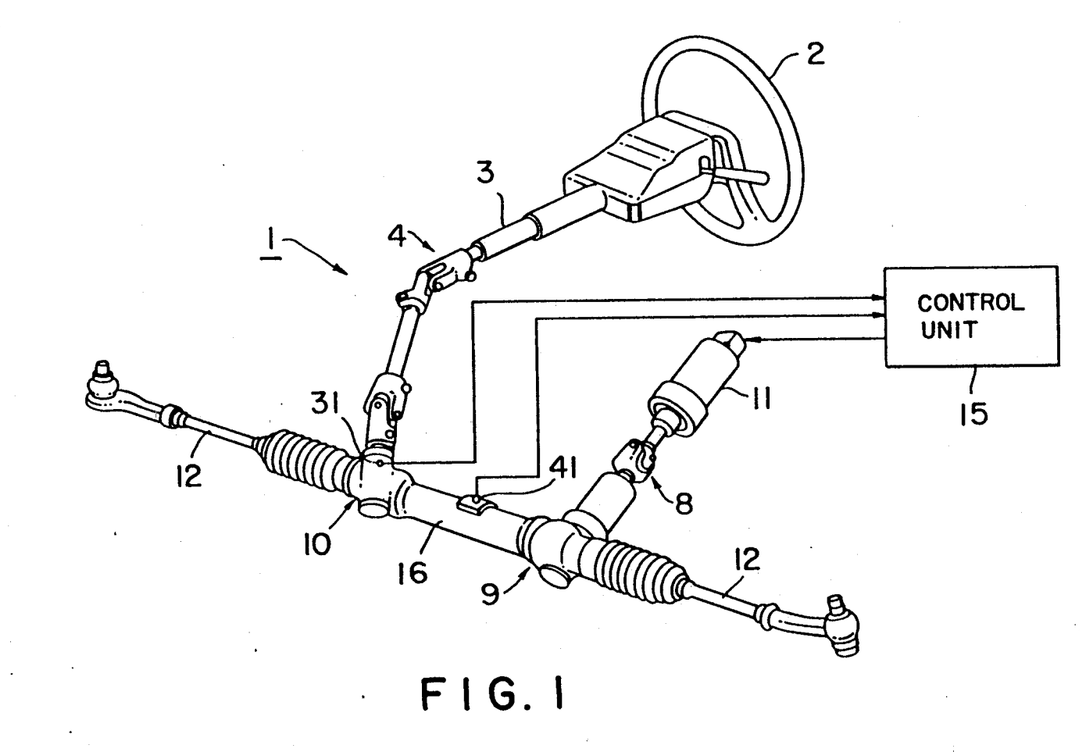
FIG. 1 is a schematic view showing an embodiment of a motor control system according to the present invention.

Referring to FIG. 1, a steering apparatus 1 is a rack-and-pinion type and comprises a steering wheel 2 connected to a steering shaft 3 for steering front wheels. A steering mechanism 4 is mainly constructed of the steering wheel 2 and the steering shaft 3. A rack-and-pinion mechanism 9 is constructed of a rack 16 and a pinion (not shown). The mechanism 9 is operatively connected to a joint 8. Rods 12 and 12 are projected from a gear box 10 and the rack-and-pinion mechanism 9, respectively. A torsion torque sensor 31 is provided on the gear box 10 for measuring the torsion torque of the steering shaft 3. A steering angle sensor 41 is provided on the rack 16 so as to measure the axial movement of the rack 16 corresponding to the turn of the steering wheel 2 of the vehicle. The outputs of the sensors 31 and 41 are sent to a control unit 15 to control an electric motor 11 for power assisted steering.

The motor 11 is coupled via a speed reduction device, the joint 8 of the rack-and-pinion mechanism 9 of the steering apparatus 1 for supplying an assist power thereto.

Figure 2:
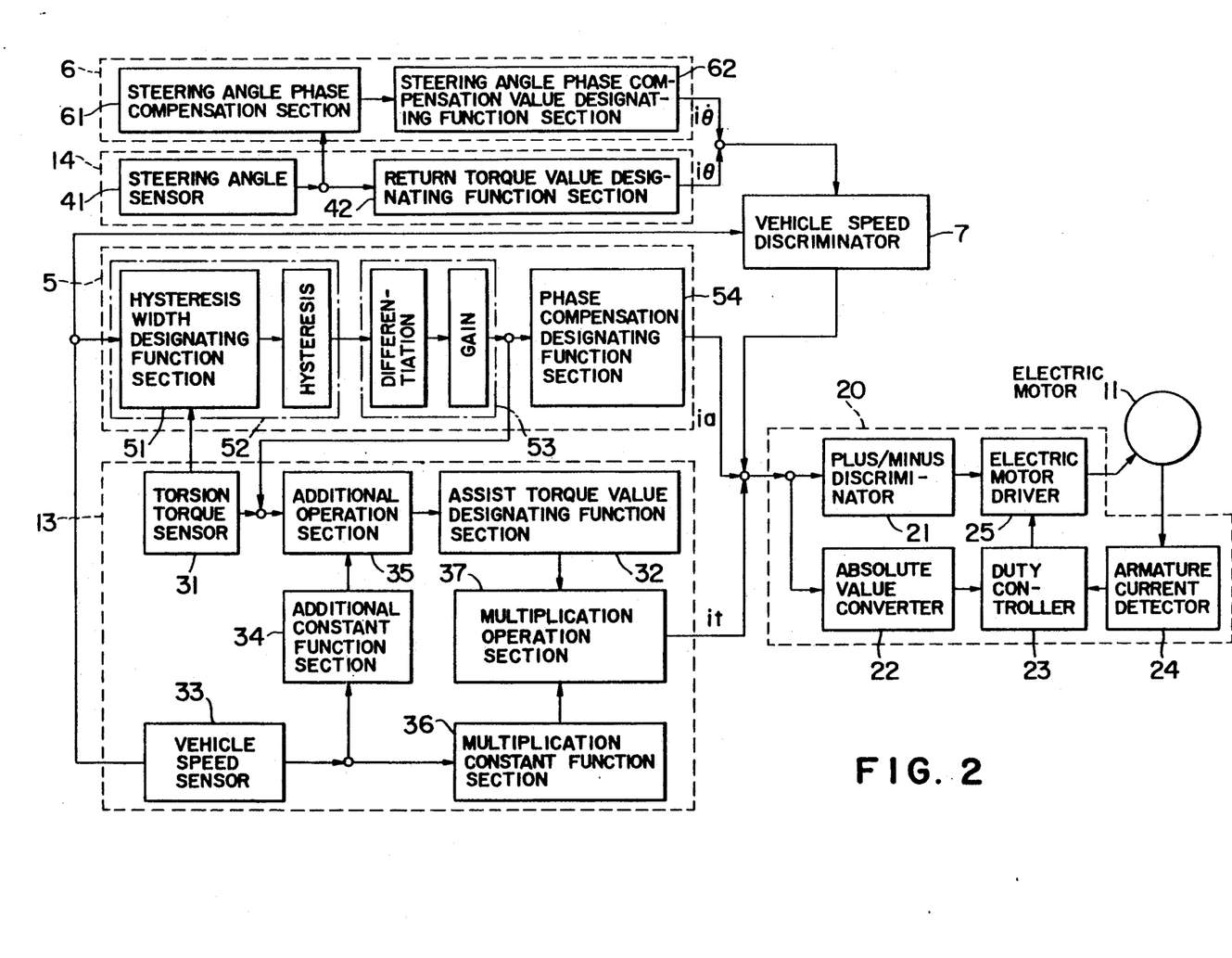
FIG. 2 is a block diagram showing the embodiment of the motor control system according to the present invention.

In FIG. 2, the rotational direction and torque of the electric motor 11 is controlled by a drive control unit 20 in accordance with a command signal supplied thereto. The drive control unit 20 is constructed of a plus/minus discriminator 21, an absolute value converter 22, a duty controller 23, an armature current detector 24, an electric motor driver 25. The command signal is inputted to the plus/minus discriminator 21 and the absolute value converter 22. A discrimination signal from the plus/minus discriminator 21 is inputted to the electric motor driver 25 so that a direction of motor current is changed in accordance with the command signal. An output signal from the absolute value converter 22 is supplied to the duty controller 23 to determine the duty ratio which is supplied to the electric motor driver 25 to set rotation torque in accordance with an amplitude of the command signal. The rotation torque of the electric motor 11 is controlled so as to have a constant value in such a manner that the armature current detector 24 detects an armature current of the electric motor 11 and feeds back a detected value to the duty controller 23.

The command signal supplied to the drive control unit 20 is generated by an assist command unit 13, a return command unit 14, a phase compensation command unit 5 as phase compensation means, and a steering angle phase compensation command unit 6.

Figure 3:
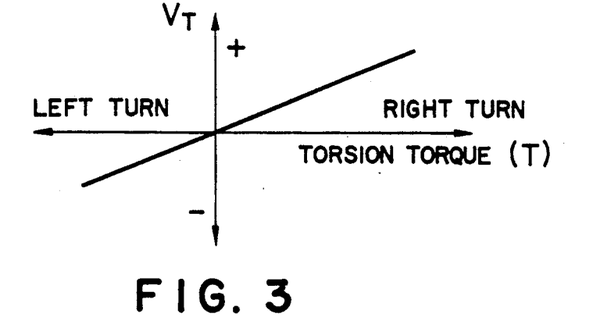
FIG. 3 is a graph showing a characteristic of a torsion torque sensor.

The assist command unit 13 generates an assist signal in accordance with a magnitude and direction of a torsion torque of the steering apparatus 1. The assist command unit 13 is provided with a torsion torque sensor 31 and an assist torque value designating function section 32. The torsion torque sensor 31 is mounted on the gear box 10 of the steering apparatus 1 to detect the magnitude and direction of the torsion torque. The assist torque value designating function section 32 outputs the assist signal based on an output voltage signal (refer to FIG. 3) from the torsion torque sensor 31. The assist signal has a fundamental characteristic as shown by a solid line in the graph of FIG. 4. Namely, the assist signal is not outputted when the magnitude of the torsion torque is smaller than or equal to a predetermined value, but outputted when it exceeds the predetermined value while increasing or decreasing the amplitude thereof in accordance with a polarity and the magnitude of the torsion torque.

Figure 4:
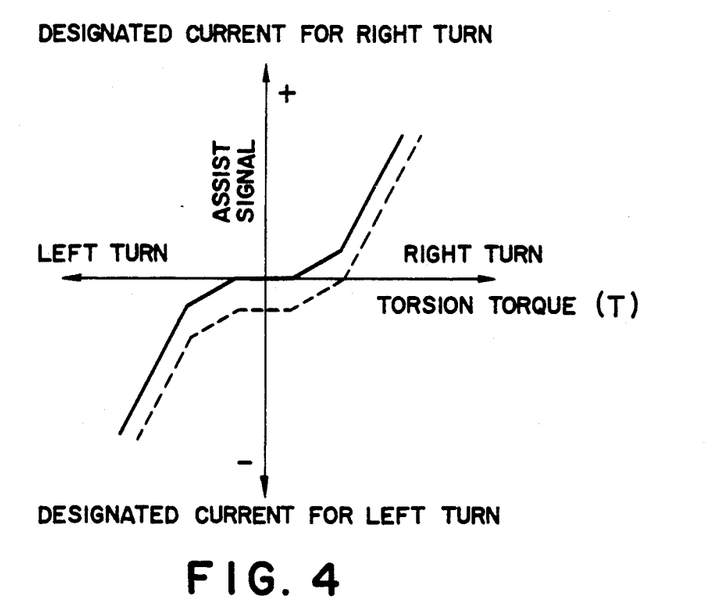
FIG. 4 is a graph showing a fundamental characteristic of an assist signal.
Figure 5:
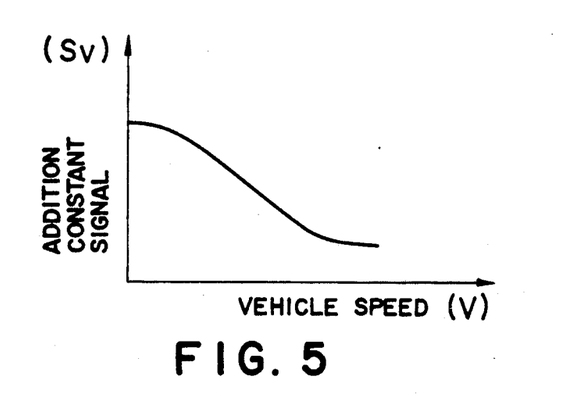
FIG. 5 is a graph showing a characteristic of an addition constant signal.

The assist command unit 13 is further provided with a vehicle speed sensor 33 for detecting speed of a vehicle, an additional constant function section 34 and an additional operation section 35. The additional constant function section 34 generates an additional constant signal Sv in accordance with an output voltage signal from the vehicle speed sensor 33, the additional constant signal Sv having a characteristic of decreasing amplitude as the vehicle speed increases as shown in the graph of FIG. 5. The additional operation section 35 receives the additional constant signal Sv and an output signal from the torsion torque sensor 31 and outputs the sum thereof to the assist torque value designating function section 32. The additional operation section 35 performs an operation of adding/subtracting the additional constant signal Sv to/from the output signal of the torsion torque sensor 31 in accordance with the polarity of the output signal. In the characteristic shown in the graph of FIG. 4, the assist signal is controlled to change in an X axis direction as a vehicle velocity parameter changes. An output from the assist torque value designating function section 32, as shown by the solid line in FIG. 6 which represents a right turn by way of example, decreases its absolute value as the vehicle speed increases under the condition of the same torsion torque value, and increases its absolute value as the absolute value of the torsion torque increases under the condition of the same vehicle speed. In order to change the output characteristic as shown by the broken line in FIG. 6 in accordance with the vehicle speed, there are provided a multiplication constant function section 36 and a multiplication operation section 37. The multiplication constant function section 36 outputs a multiplication constant signal having the characteristic shown in FIG. 7 in accordance with an output voltage signal from the vehicle sensor 33. The multiplication constant signal takes a value 1 when the vehicle speed is 0, and a value decreasing toward 0 as the vehicle speed increases. The multiplication operation section 37 performs an operation of multiplying an output from the assist torque value designating function section 32 by the multiplication constant. The assist signal it from the multiplication operation section 37 has a value which changes in accordance with the vehicle speed as shown by a broken line in FIG. 6.

Figure 8:
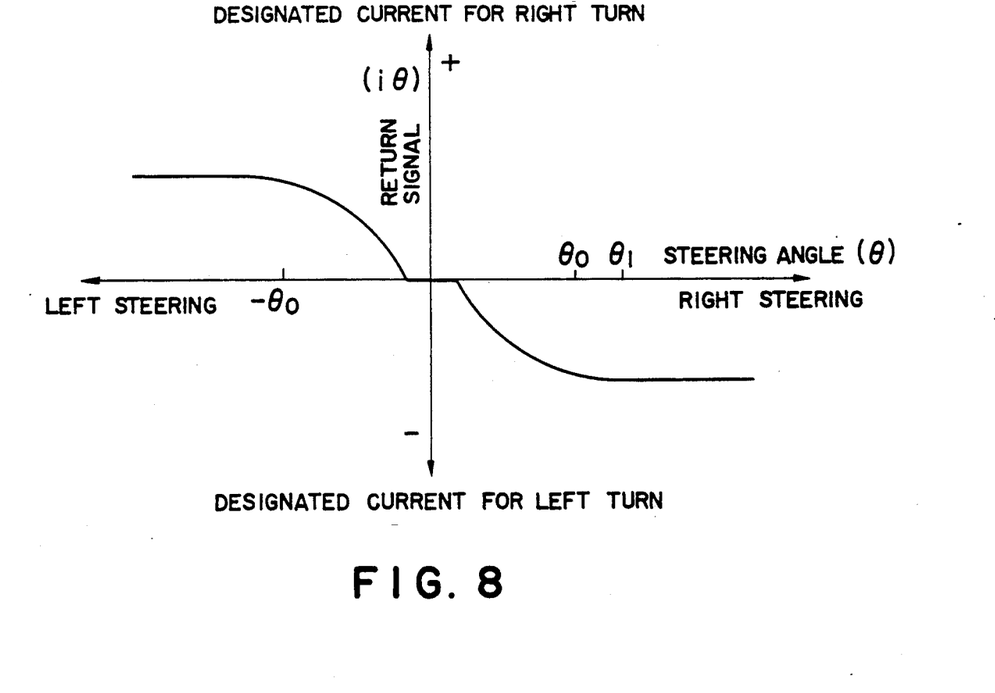
FIG. 8 is a graph showing a characteristic of a return signal.

The return command unit 14 generates a return signal for returning the steering angle to the neutral (straight forward) position in accordance with an angle of the steering apparatus 1. The return command unit 14 is provided with a steering angle sensor 41 for detecting a steering angle based on the movement of, e.g., the rack 16 of the rack-and-pinion mechanism 9 of the steering apparatus 1, and a return torque value designating function section 42 for outputting a return signal i$\theta$ having a characteristic shown in the graph of FIG. 8 in accordance with an output voltage signal from the steering angle sensor 41.

The phase compensation command unit 5 generates a supplementary assist signal ia which is proportional to the change rate of the torsion torque, and is provided with hysteresis means 52, a phase compensation section 53 and a phase compensation designating function 54. The hysteresis means 52 includes a hysteresis width designating function section 51 to which an output signal from the vehicle speed sensor 33 is supplied. The phase compensation section 53 receives via the hysteresis means 52 an output signal from the torsion torque sensor 31. The phase compensation designating function section 54 receives an output signal from the phase compensation section 53. The output signal from the phase compensation section 53 is also added to an output signal from the torsion torque sensor 31, and the resultant signal is inputted to the additional operation section 35 of the assist command unit 13.

Figure 9:
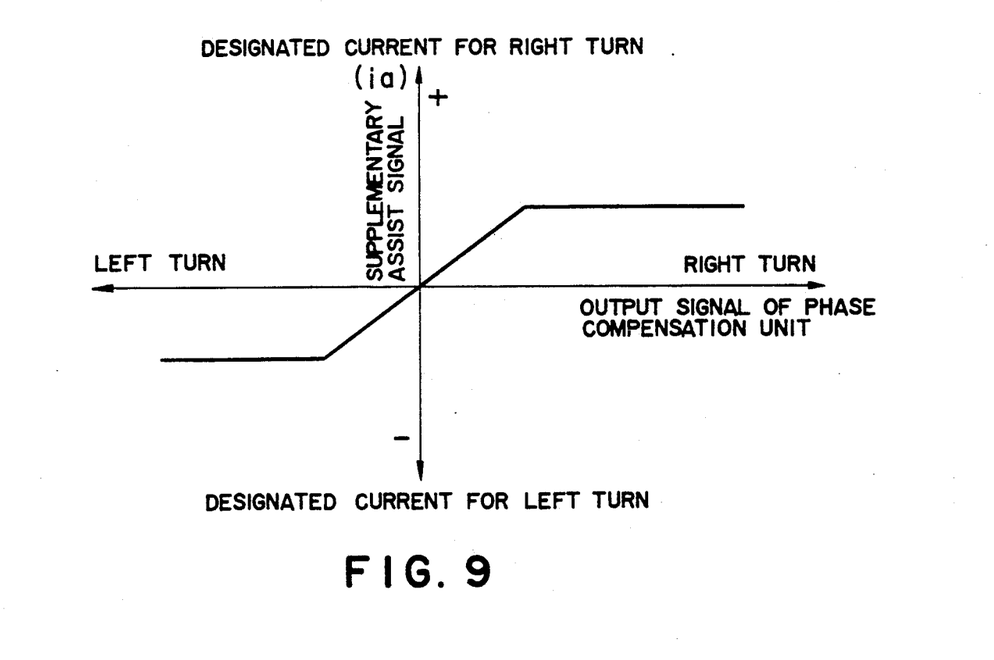
FIG. 9 is a graph showing a characteristic of a supplemental assist signal.
Figure 11:
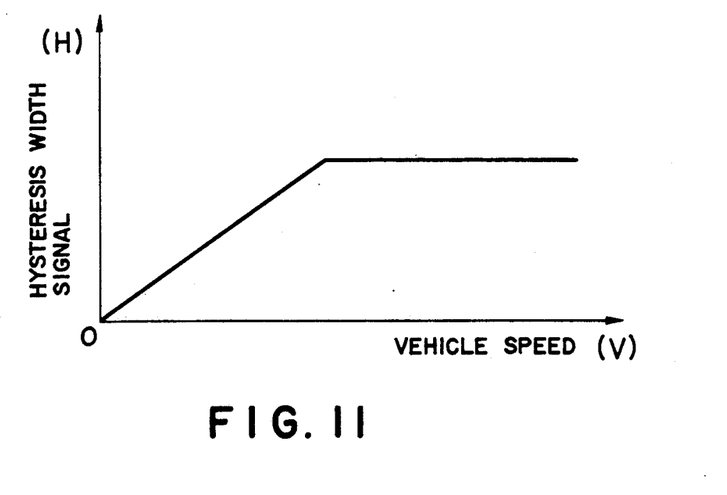
FIG. 11 is a graph showing a characteristic of a hysteresis width.

The hysteresis width designating function section 51 outputs a hysteresis width signal H which has the characteristic that it increases proportionally with an increase of the vehicle speed up to a predetermined value, and thereafter reaches a certain constant value, as shown in the graph of FIG. 11. The phase compensation section 53 differentiates an output signal from the torsion sensor 31 supplied via the hysteresis means 52, and outputs a signal which is proportional to the differentiated value. The phase compensation designating function section 54 outputs the supplementary assist signal ia which has the characteristic that the supplementary assist signal ia increases proportionally within a predetermined range of a change rate of the torsion torque, and thereafter reaches the predetermined value, as shown in FIG. 9.

Figure 10:
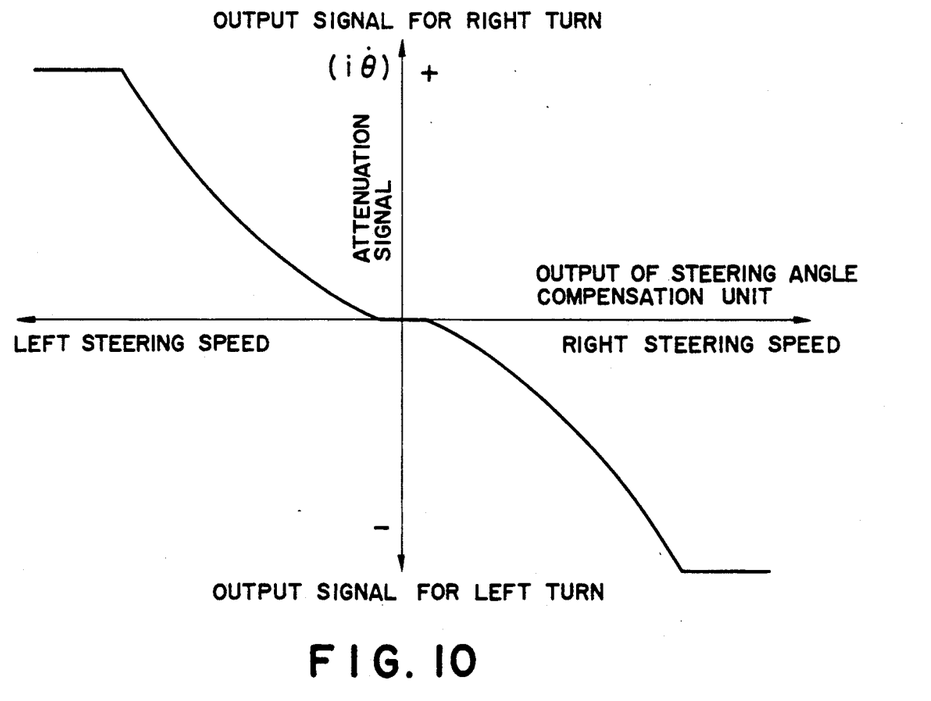
FIG. 10 is a graph showing a characteristic of an attenuation signal.

The steering angle phase compensation command unit 6 generates an attenuation signal toward the direction opposite to the direction of steering in accordance with the steering operation speed. The steering angle phase compensation command unit 6 is provided with a steering angle phase compensation section 61 and a steering angle phase compensation value designating function section 62. The steering angle phase compensation section 61 receives an output signal from the steering angle sensor 41 and generates a signal which is proportional to the differentiated value of the inputted signal. The steering angle phase compensation value designating function section 62 outputs an attenuation signal $i\dot{\theta}$ having the characteristic shown in the graph of FIG. 10 in accordance with the output signal from the steering angle phase compensation section 61.

In this embodiment, there is also provided a vehicle speed discriminator 7 for restricting outputting the sum of a return signal $i\theta$ from the return command unit 14 and an attenuation signal $i\dot{\theta}$ from the steering angle phase compensation command unit 6. The vehicle speed discriminator 7 receives a sum of the return signal $i\theta$ and attenuation signal $i\dot{\theta}$ and outputs the sum when the vehicle speed becomes higher than or equal to, e.g., 5 Km/h with reference to an output signal from the vehicle sensor 33, and restricts outputting a sum signal when the vehicle speed becomes lower than 5 Km/h.

Under such restriction by the vehicle speed discriminator 7, outputted to the drive control unit 20 as the command signal is the sum of the assist signal it from the assist command unit 13 and the supplementary assist signal ia from the phase compensation command unit 5.

In operation of the motor control system constructed as above, upon generation of the torsion torque at the steering apparatus 1 under steering operation, the torsion torque sensor 31 detects the torsion torque and delivers a torsion torque signal. In this case, the assist signal it based on the torsion torque is adjusted in accordance with the signals from the vehicle speed sensor 33 and steering angle sensor 41. The assist signal it is deprived from the plus/minus discrimination and duty ratio control signals based on the absolute value to control the rotational direction and the torque of the electric motor 11. The relationship between the torsion torque and the assist signal it is basically shown in the graph of FIG. 4. For example, a positive assist signal is outputted for the right turn while increasing the amplitude as the torsion torque increases. Therefore, the electric motor 11 is driven to rotate in the direction to assist the right turn with an output torque corresponding to the torsion torque, and therefore resulting in a reduction of steering force for turning to the right. For the left turn, a negative assist signal is supplied to rotate the electric motor 11 in the direction to assist the left turn in a similar manner to the right turn.

Figure 6:
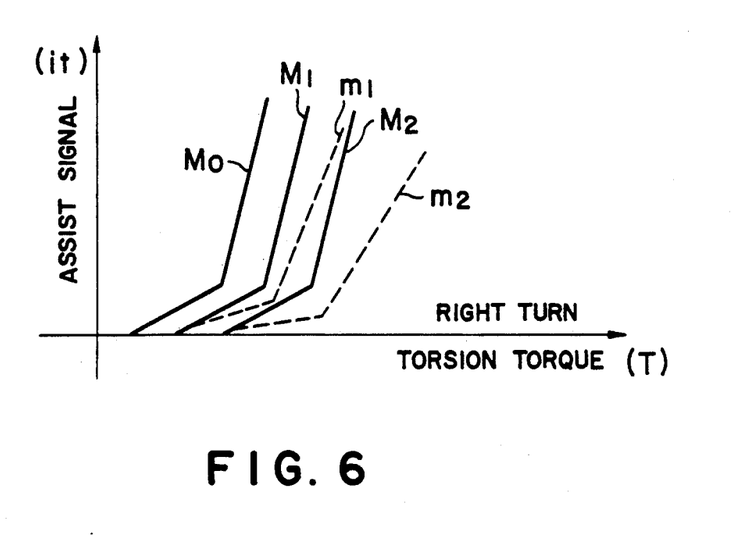
FIG. 6 is a graph showing a change of the characteristic of the assist signal.
Figure 7:
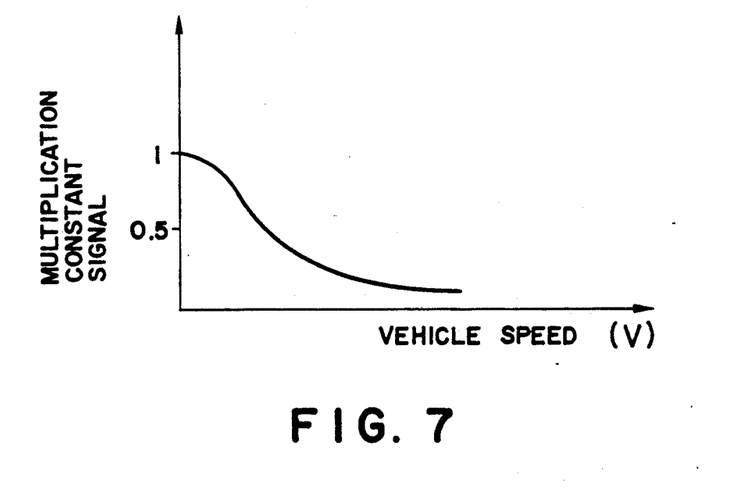
FIG. 7 is a graph showing a characteristic of a multiplication constant signal.

The functional characteristic between the torsion torque and the assist signal changes in accordance with an output signal from the vehicle sensor 33. For example, referring to the graph of FIG. 6 showing the characteristic of the assist signal relative to the right turn torsion torque, as the vehicle speed increases from 0 indicated by M0 assist signal to V1 and V2 indicated by M1 and M2 assist signals, respectively, the assist signals M1 and M2 are moved in parallel with M0 in the X-axis direction of FIG. 6 through the additional operation of the additional constant signal Sv from the additional constant function section 34. The assist signal M1 and M2 are changed to assist the signals m1 and m2 having a smaller inclination through a multiplying operation by a multiplication constant signal. Thus, the amplitude of the assist signal decreases as the vehicle speed increases under the condition of the same torsion torque. This means that the output torque of the electric motor 11 decreases as the vehicle speed increases under the condition of the same torsion torque. Therefore, while retaining a sufficient power assist during a low speed running of the vehicle, a steering force does not become excessive during a high speed running of the vehicle, thus eliminating uneasiness caused by too light operation of a steering wheel.

In the meantime, the steering angle sensor 41 detects the steering angle upon steering operation. In accordance with the detected steering angle, the return signal $i\theta$ is outputted which has the characteristic shown in FIG. 8. Namely, the return signal $i\theta$ is not outputted near a neutral position of steering angle $\theta$, increases proportionally within the range between right and left steering angles plus/minus $\theta_0$, and takes a constant value outside the range between plus/minus $\theta_0$, while taking a negative value (left turn direction) within the right turn range and a positive value (right turn direction) within the left turn range.

The steering phase compensation section 61 detects a rapid change of the steering angle $\theta$ caused by a rapid handling at a small radius curve. In accordance with the detected signal, an attenuation signal $i\dot{\theta}$ outputted from the steering angle phase value designating function section 62, the characteristic of the attenuation signal being shown in FIG. 10.

During the running state, the return signal $i\theta$ and the attenuation signal $i\dot{\theta}$ are added so as to decrease the assist signal it under the function of the vehicle speed discriminator 7, thereby eliminating uneasiness due to too light handling operation during rapid steering. In addition, during steering at the right turn steering angle $\theta_1$, the positive assist signal it obtained based on the output signal from the torsion torque sensor 31 is added to the negative return signal $i\theta_1$ obtained based on the output signal from the steering angle sensor 41 to control the electric motor 11 in accordance with the added signal. In FIG. 4, the assist signal it is indicated by a solid line, whereas the added signal is indicated by a broken line. Consequently, upon release of maintaining the steering at the right turn steering angle $\theta_1$, the torsion torque T decreases considerably so that the added signal immediately takes the negative value (left turn direction) following the broken line shown in FIG. 4. As a result, the torque in the left turn direction is generated on the electric motor 11 so that a friction force at the reduction mechanism and the moment of inertia of the motor are cancelled to smoothly recover the straight forward direction of the steering apparatus 1, resulting in a good recovery of the steering. The amplitude of the return signal $i\theta$ decreases to 0 as the steering angle $\theta$ decreases so that when the steering angle returns to the neutral position the torque of the electric motor 11 disappears.

In the case where the steering wheel is returned to the neutral position after a rapid turn (high-G turn), the steering wheel may sometimes goes over the neutral position because of moment of inertia of the electric motor. However, the attenuation signal iθ outputted from the steering angle phase compensation command unit 6 prevents an excessive return of the steering wheel because the attenuation signal functions to generate the output torque opposite to the rotational direction of the steering wheel, thus improving the operation after a release of holding the steering wheel during a high speed running.

Next, during stopping the vehicle, a stop steering operation will be described. In this case, since resistance force from the ground or road is large, the torsion torque becomes very large during the steering operation, and the output voltage signal from the torsion torque sensor 31 becomes very large. In this case, since a hysteresis width is zero, the output voltage of the torsion torque sensor 31 directly passes through the hysteresis means 52. This rapid increase of the torsion torque is detected by the phase compensation section 53 of the phase compensation command unit 5 so that an output signal corresponding to such increase of the torsion torque T is added to an output signal from the torsion torque sensor 31. Consequently, even at the state where the torsion torque T is small and the corresponding assist signal it is not still generated, if such increase of the torsion torque is large, then the assist signal it is outputted at once so that the electric motor 11 is immediately actuated without any response delay to the stop steering operation and self-excited vibrations are prevented.

During the stop steering operation, the outputs of the return signal iθ from the return command unit 14 and the attenuation signal iθ from the steering angle phase compensation command unit 6 are restricted by the vehicle speed discriminator 7. Therefore, there occurs no energy waste so that a smooth steering can be realized.

During the middle and low speed running of the vehicle, the hysteresis width at the hysteresis means 52 takes a relatively low value corresponding to the vehicle speed. Therefore, during the repetitive right and left turns, the signals from the torsion torque sensor 31 which exceed the hysteresis width are inputted to the phase compensation section 53 so that the supplementary assist signal ia is immediately outputted from the phase compensation designating function section 54 in accordance with the direction of change of the torsion torque. Therefore, a good control response is ensured such as an improvement on steering feeling by absorbing moment inertia at the start and stop of the electric motor 11.

Further, vibrations from the roads during a straight forward running of the vehicle are relatively small during the middle and low speed running range so that the torsion torque caused by such external disturbance is cut off by the hysteresis means 52.

Vibrations from roads become large during the high speed running of the vehicle. However, in this case the hysteresis width at hysteresis means 52 increases correspondingly so that external disturbance due to vibrations from the roads can be effectively eliminated, inhibiting unnecessary signals outputted from the phase compensation section 53.

As described so far, according to the present invention, the phase compensation designating section which outputs the supplementary assist signal cuts a small input with the aid of the hysteresis means. Therefore, the hysteresis width changes to become large during the high speed running, and small during the low speed running. Thus, external disturbance due to vibrations from the roads during the high speed running can be effectively eliminated, and during the low speed running a control response can be ensured sufficiently.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A motor control system for an electric power steering apparatus mounted on a motor vehicle with wheels and a steering wheel operatively connected to said wheels, said system having an electric motor for assisting the operation of said steering wheel, a torsion torque sensor for detecting a torsion torque in said steering apparatus and providing a torsion torque signal indicative thereof, a vehicle speed sensor for detecting vehicle speed and providing a vehicle speed signal indicative thereof, a steering angle sensor for detecting a steering angle of said steering wheel and providing a steering angle signal indicative thereof, and controlling means responsive to said torsion torque signal, said vehicle speed signal and said steering angle signal for controlling a rotational direction and output torque of said electric motor so as to assist the operation of said steering wheel, said system comprising:

hysteresis means which defines a hysteresis width for eliminating undesirable disturbances in said torsion torque signal over the entire range of said torsion torque signal by removing variations of said torsion torque signal within said hysteresis width whereby said signal variations are removed to thereby produce a corrected torsion torque signal, said hysteresis means being responsive to said vehicle speed signal for designating said hysteresis width, said hysteresis means increasing said hysteresis width in accordance with increase of said vehicle speed so as to effectively eliminate external disturbances thereon;

calculating means responsive to said corrected torsion torque signal corrected by said hysteresis means for calculating a compensation torque to produce a compensation torque signal; and said controlling means responsive to said compensation torque signal for controlling said electric motor.

2. The system according to claim 1, wherein said calculating means comprises:

a differentiator provided to differentiate said corrected torsion torque signal from said hysteresis means and to provide a differentiated value; and a calculator provided to calculate said compensation torque in response to said differentiated value, an absolute value of said compensation torque being increased as an increase of said differentiated value.

3. The system according to claim 1, wherein said controlling means comprises:

a first circuit provided to produce an assist torque signal in response to said vehicle speed and said torsion torque signal;

a second circuit provided to produce a return torque signal in response to said steering angle;

a third circuit provided to produce an attenuation torque signal in response to said steering angle; and a driver provided to control said rotational direction and said output torque of said electric motor in response to said assist torque, said return torque, said attenuation torque and said compensation torque signal.

4. A motor control system for an electric power steering apparatus mounted on a motor vehicle with wheels and a steering wheel operatively connected to said wheels, said system having an electric motor for assisting the operation of said steering wheel, a torsion torque sensor for detecting a torsion torque in said steering apparatus and providing a torsion torque signal indicative thereof, a vehicle speed sensor for detecting vehicle speed and providing a vehicle speed signal indicative thereof, a steering angle sensor for detecting a steering angle of said steering wheel and providing a steering angle signal indicative thereof, and controlling means responsive to said torsion torque signal, said vehicle speed signal and said steering angle signal for controlling a rotational direction and output torque of said electric motor so as to assist the operation of said steering wheel, said system comprising:

hysteresis means which defines a hysteresis width for eliminating undesirable disturbances in said torsion torque signal over the entire range of said torsion torque signal by removing variations of said torsion torque signal within said hysteresis width whereby said signal variations are removed to thereby produce a corrected torsion torque signal, said hysteresis means being responsive to said vehicle speed signal for designating said hysteresis width, said hysteresis means increasing said hysteresis width in accordance with increase of said vehicle speed whereby said hysteresis means sets a current value of said torsion torque signal dependent upon a past reaction of said hysteresis means to a change of said torsion torque signal and said hysteresis width so as to effectively eliminate external disturbances thereon;

calculating means responsive to said torsion torque signal corrected by said hysteresis means for calculating a compensation torque to produce a compensation torque signal; and said controlling means responsive to said compensation torque signal for controlling said electric motor.

* * * * *